US006654755B1

(12) United States Patent
Vänskä

(10) Patent No.: US 6,654,755 B1
(45) Date of Patent: Nov. 25, 2003

(54) INFORMATION MANAGEMENT TECHNIQUE

(75) Inventor: Marko Vänskä, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/494,471

(22) Filed: Jan. 31, 2000

(51) Int. Cl.$^7$ .......................... G06F 17/30; G06F 13/00
(52) U.S. Cl. .......................... 707/100; 707/102; 725/46
(58) Field of Search .................... 707/1–10, 200, 707/500, 526, 500.1, 100–103; 715/500.1, 526, 514; 345/738, 748

(56) References Cited

U.S. PATENT DOCUMENTS 5,802,518 A * 9/1998 Karaev et al. ............... 707/9

* cited by examiner

Primary Examiner—Alford Kindred
(74) Attorney, Agent, or Firm—Antonelli, Terry, Stout & Kraus, LLP

(57) ABSTRACT

An information management technique includes gathering and storing data from a plurality of sources of data. The gathered and stored data is then filtered and prioritized. The filtered and prioritized data is then packaged and delivered to an end user. The data is filtered and prioritized in a plurality of layers arranged sequentially, a first layer having a broadest categorization of data and each subsequent lower layer having a narrower categorization of data than its adjacent higher layer. The plurality of data sources may include external sources of data such as sources of data accessible on the Internet and internal sources of data such as sources of data accessible on a corporate Intranet. When the data is prioritized as a "high" priority, then the data may be immediately delivered to the end user while if the data is prioritized as a "low" priority, a signal may be sent to the end user and the data delivered only upon a request by the end user.

24 Claims, 8 Drawing Sheets

INFORMATION MANAGEMENT TECHNIQUE

BACKGROUND

1. Field of the Invention

The present invention relates to an information management technique and more particularly to an information management technique for handling and prioritizing and filtering information from external and internal sources, such as, Internet and Internet sources, and forwarding same to a user.

2. Description of the Related Art

The use of the Internet and Intranet for the sharing and forwarding of information has increased tremendously over the past few years. Unfortunately, it has not reached its full potential partly due to the fact that there is too much information available. That is, upon requesting information from the Intranet or from an Internet, a user is inundated with information. Much of the information is only peripherally related to the topic requested by the user and therefore superfluous. Accordingly, the user must review this large amount of information to locate the relevant information desired by the user.

European Patent Publication 1,348,884 B1, published PCT Application No. W097/27534, and U.S. Pat. Nos. 5,369,570, and 5,544,354 each disclose attempted solutions to the problem.

For example, PCT Published Application No. W097/27534 discloses a system for navigating an information service which allows a user to navigate an on-line information system using a plurality of different screens. While simplifying the search of a user for relevant information, it nevertheless requires the user to review multiple screens and sub-screens to find the desired information.

Similarly, European Patent Publication No. 0,348,884 B1 creates navigators adjacent a main image on a screen to allow a user to navigate through the maze of information via these navigators to reduce the amount of searching needed to locate the desired information.

U.S. Pat. No. 5,369,570 discloses a method for continuous real-time management of heterogeneous interdependent resources. Multiple distributed resource engines are used to maintain timely and precise schedules and action controls, identifying and responding to rapidly changing conditions in accordance with predetermined requirements, relationships and constraints.

U.S. Pat. No. 5,544,354 discloses a user interface which provides for accessing a large database of information using both browsing and search behaviors. As with the above-noted PCT published application, it is necessary for the viewer to navigate through multiple screens to find the desired information.

SUMMARY OF THE INVENTION

The object of the present invention is to provide an information management technique which includes gathering and storing data from a plurality of sources and filtering and prioritizing the gathered and stored data. The filtered and prioritized data is then packaged and delivered to an end user. The data is filtered and prioritized in a plurality of layers arranged sequentially, a first layer having a broadest categorization of data and each subsequent lower layer having a narrower categorization of data than its adjacent higher layer.

BRIEF DESCRIPTION OF THE DRAWINGS

The foregoing and a better understanding of the present invention will become apparent from the following detailed description of example embodiments in claims when read in connection with the accompanying drawings, all forming a part of the disclosure of this invention. While the foregoing and following written and illustrated disclosure focuses on disclosing example embodiments of the invention, it should be clearly understood the same is by way of illustration and example only and the invention is not limited thereto. The spirit and scope of the present invention are limited only by the terms of the appended claims.

The following represents brief descriptions of the drawings, wherein.

DESCRIPTION OF THE INVENTION

Figure 1:
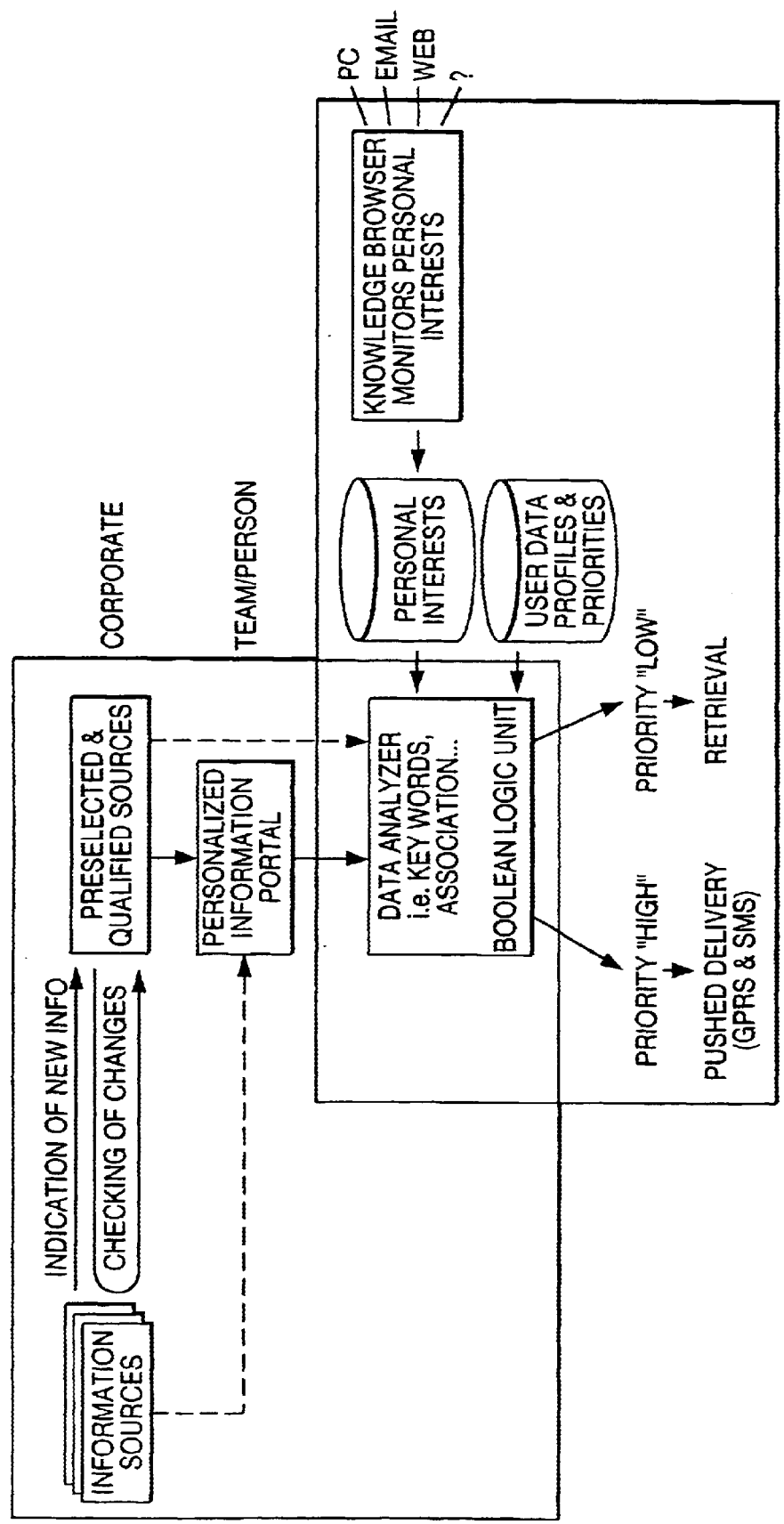
FIG. 1 illustrates the handling and prioritizing of new information in accordance with an example embodiment of the present invention.
Figure 2:
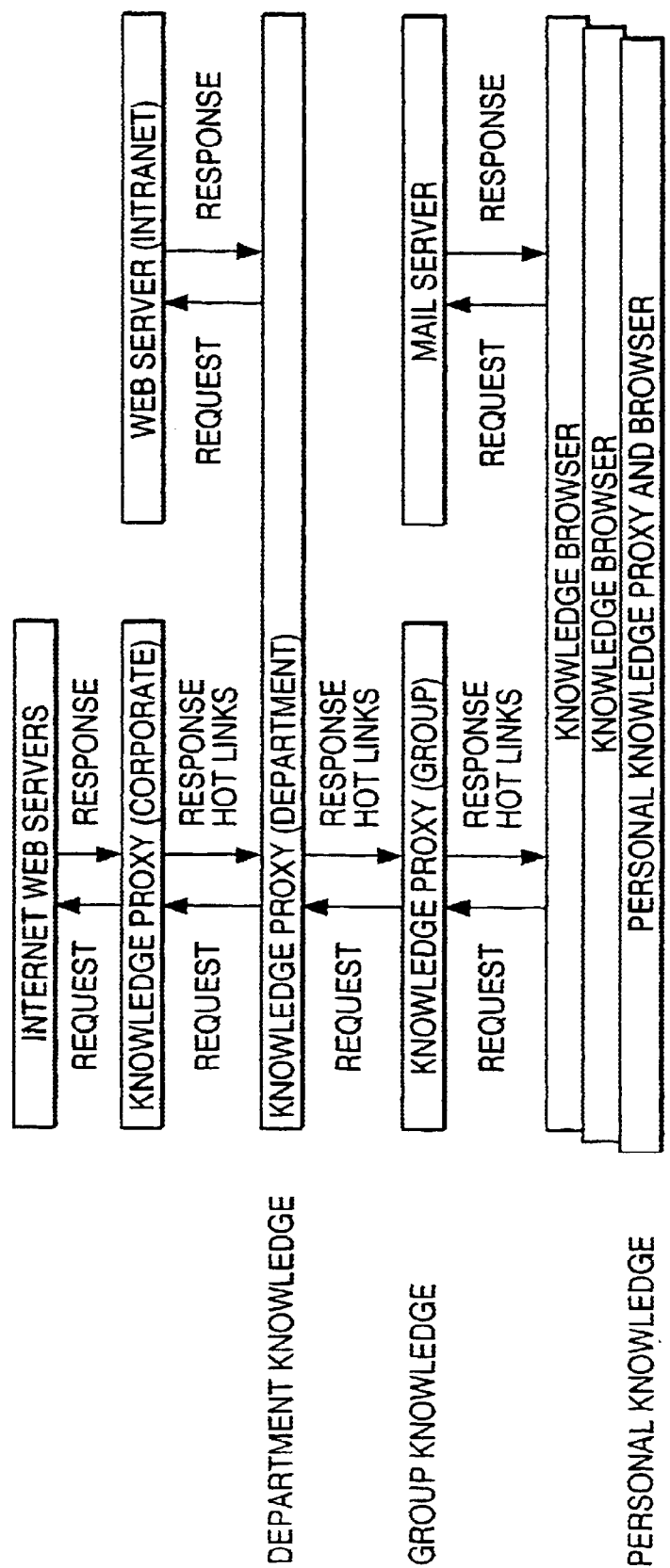
FIG. 2 illustrates the system's ladders going from top to bottom.
Figure 3:
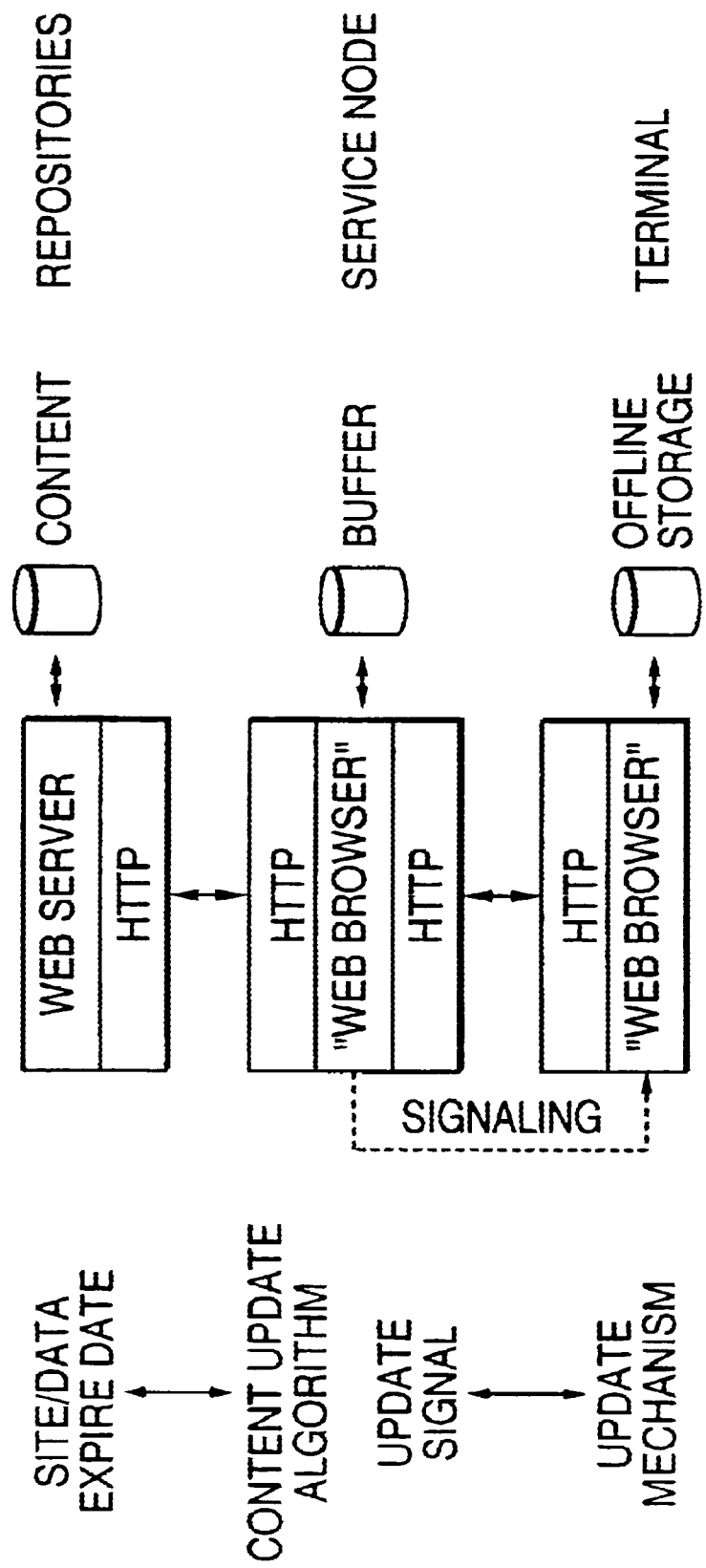
FIG. 3 illustrates the flow of information during an information update.
Figure 4:
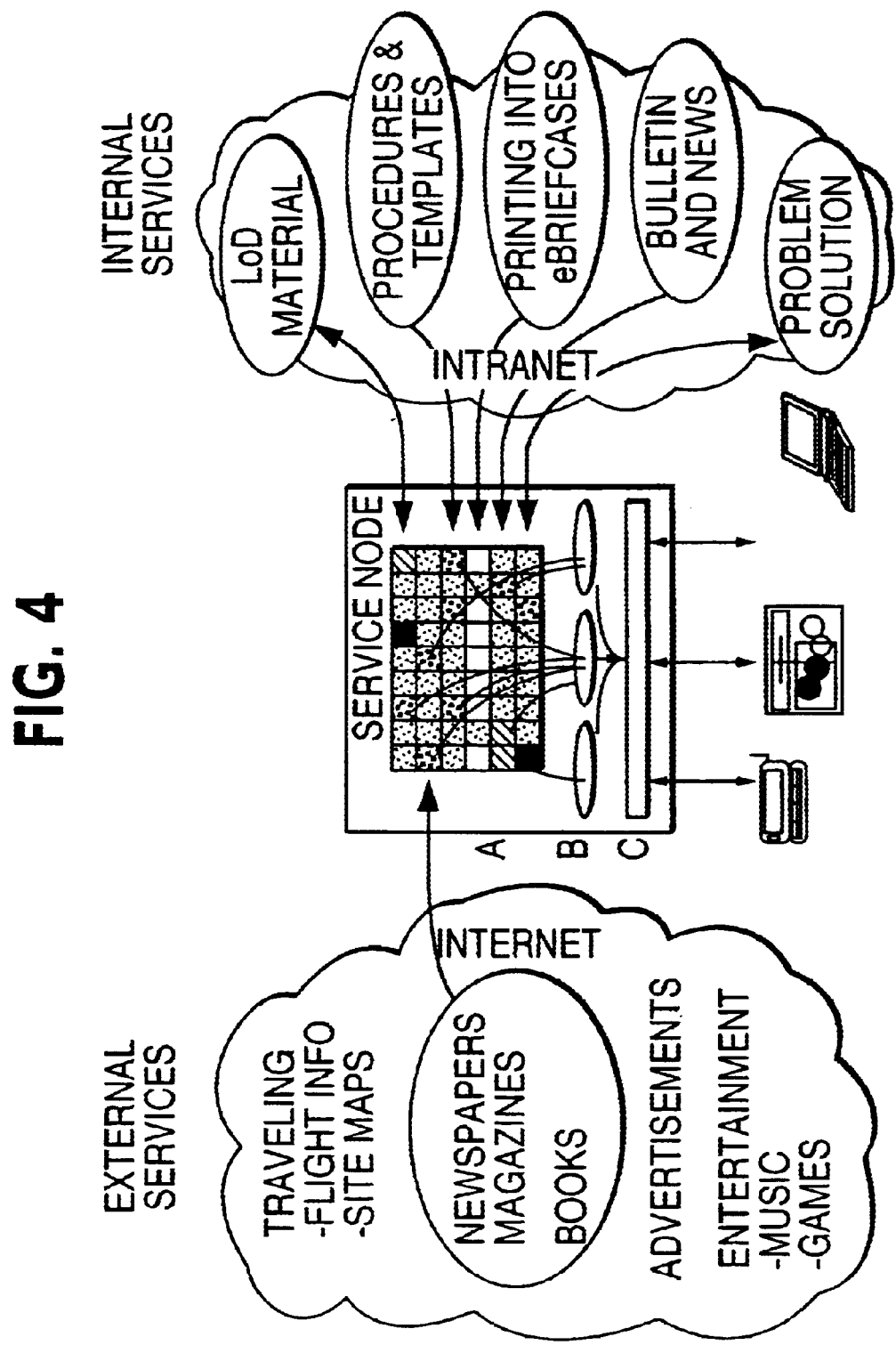
FIG. 4 illustrates the flow of information between internal and external sources and the user via a service node.

FIG. 1 illustrates the handling and prioritizing of new information in accordance with an example of the present invention and FIG. 2 illustrates the system ladders from top to bottom and FIG. 3 illustrates the flow of information during an information update. FIG. 4 illustrates the flow of information of FIGS. 1–3 between the internal and external sources and the user via the service node.

Referring to FIGS. 1–4, the present invention gathers and stores information and knowledge from different predefined sources plus additional sources via association The information and knowledge data is filtered and prioritized based on predefined personal selections and interest areas of a user. The data is logically presented and delivered to the end user with different priorities to different kinds of terminals.

Initially, a user profile is entered into the system. This information is stored in the user data profiles and priority storage area illustrated in FIG. 1. In addition, a knowledge browser monitors the personal interests of the individual user and stores the personal interests in the personal interest storage area illustrated in FIG. 1.

As illustrated in FIG. 2, there are various layers of filtering depending on the number of users for each layer. That is, at the lowest level, the knowledge browser or personal knowledge proxy and browser filters and categorizes the information to the greatest extent for a single user.

The group knowledge layer is for a group of end users and the categorization is broader than that of the personal knowledge layer. In a similar fashion, the department knowledge layer for a department which consists of a number of groups categorizes in still a broader fashion than that of the group knowledge layer and the corporate knowledge layer for a corporate entity which consists of a number of departments is even broader still in categorization.

The categorization layer scheme of FIG. 2 serves to simplify and reduce the amount of data to be categorized and filtered and transferred by narrowing the categorization scope at each level so as to minimize the amount of data that an end user must sort through.

The corporate layer server has all of the available and preselected qualifiers in it. The corporate server also has the function to check from the outside information sources whether there are changes in old information source or additional new added information sources.

The group and department layer servers divide the information into small categorized segments of information, based on the priorities and interests of the end users of the group/department.

In the personal layer, the knowledge browser monitors and collects the interests of the end user. The end user data profiles on priorities are filtered so that a specific data analyzer can make decisions based on key words, association, subscription, etc. to offer the end user the available information.

With user data profiles on priorities, the association mechanism knows what a user wants to know and actively searches for data with the help of the server agents through the information stream of personal data sources, department data sources, group data sources, and corporation data sources.

The delivery mechanism depends on the priority of the data. If the priority is set to "high" the material is pushed to the end user terminal with a notice. On the other hand, if the priority is set to "low", the material is collected and forwarded to the personal server and stored in a buffer but is not actively sent to the user.

The delivery to the user may include one or more of the following:

A. Selecting a newspaper delivery with priority status;
B. a newspaper being ready for delivery;
C. a data retriever indicates new or changed information is waiting;
D. information is loaded into a buffer if someone has selected a priority status;
E. setting a flag for notification and sending a signal/alert to all subscribers;
F. a terminal receives the signal; and
G. if the data is within acceptable limits, the terminal loads the information into an offline memory.

This mechanism enables a user to always have all of the data available and up-to-date so that the user receives recently published material shortly after it has been published. Material such as newspapers, documents, magazines, books, and learning materials can be stored either in the network server storage area or can be downloaded to the offline memory of the user terminal.

As illustrated in FIG. 3, information is updated by checking for changes of predefined information category status from different repositories.

If the status of these predetermined categories have changed, the server sends a request for that particular data stream and loads that new information into a buffer. The server also sets a notification flag and sends a signal to all subscribers. The signal includes information about the size of the data stream and the estimated loading time. It also may provide options to the end users with regard to the delivery of the data stream if the size of the data is beyond a predetermined limit.

If the information category is determined to be of a "high" priority, then the service sends it immediately to the subscriber terminal. Otherwise, when the user terminal receives the signal, the user can choose to load or reject that particular data stream.

If the user terminal is not connected to the network, the information is stored in a buffer and when the user terminal is connected to the network, the server determines if there is anything to be updated and if so updates the information. The need for information updating is determined by the service node.

FIG. 4 illustrates the flow of information between internal and external sources and the user via the service node.

The service node contains elements A, B, and C. Element A is a knowledge mapping element which includes a link catalog and data buffer. Element B is an element which includes profiling, filtering, and context maps in the corporate, department, group, and personal levels while element C includes a media adapter, data formatter, and portals.

As illustrated in FIG. 4, data from external sources via the Internet and data from internal sources such as a corporate Intranet, are all fed to the service node.

In the element A, the various information data is mapped and buffered and then inputted to the element B where it is profiled and filtered on various levels and then forwarded to the various users.

Figure 5:
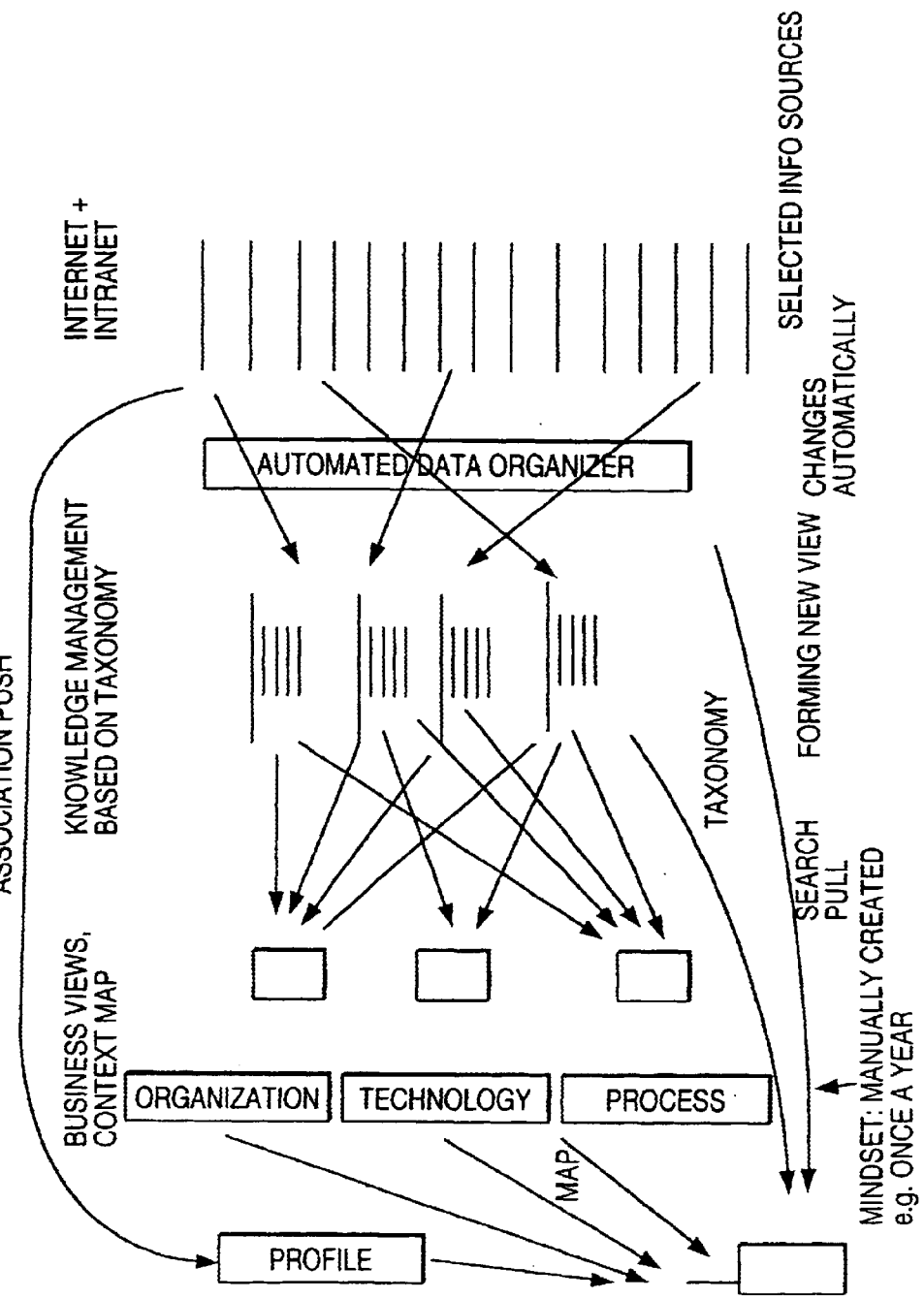
FIG. 5 illustrates the gathering and providing of information to a user terminal.

FIG. 5 illustrates the gathering and providing of information data to a user and basically illustrates the knowledge mapping of the service node of FIG. 4. That is, selected information sources from either the Internet or the corporate Intranet or other sources may reach the user via various paths.

The data from the selected information sources may be selected via association (e.g., word association) based on the profile of the user and then pushed to the user if the data is determined to be of high priority.

Alternatively, the information may pass through an automated data organizer and then sorted and subjected to knowledge management based on taxonomy (that is, classification). The information, then classified as to organization, technology, or process, for example, is then forwarded to the user based on a context map determined for the user.

Figure 6:
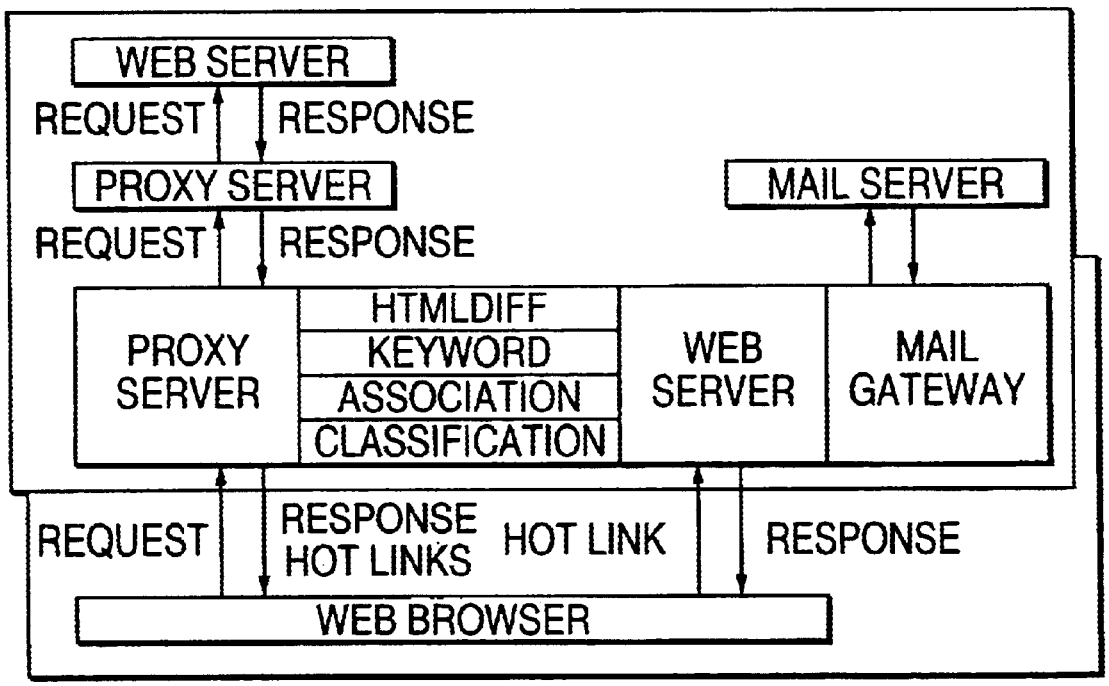
FIG. 6 illustrates the arrangement of the elements and the flow of information during associative tracing.

FIG. 6 illustrates the arrangement and the flow of information through various elements during associative tracing.

Figure 7:
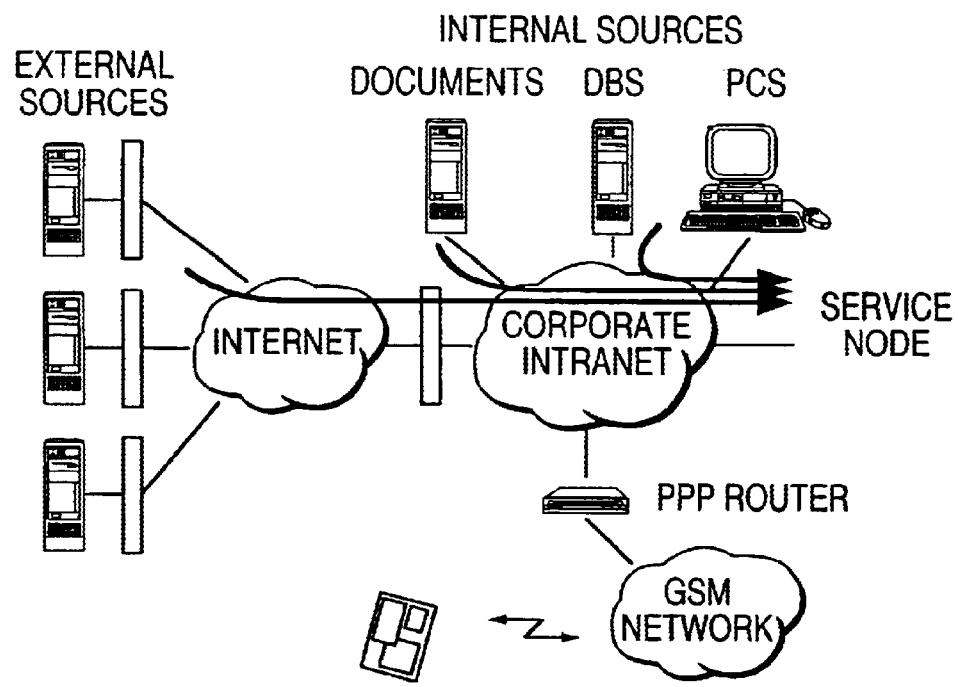
FIG. 7 illustrates the upload of pushed data from internal and external sources to a service node.

FIG. 7 illustrates the upload of pushed data from external sources via the Internet to the service node. The various external sources are connected via respective firewalls to the Internet. Normally, the data from these external sources, upon request, are forwarded through the Internet and through a corporate firewall and through a corporate intranet to the service node.

Internal sources, such as stored documents, databases, and data from individual PCs, are also inputted to the service node for classification and profiling.

Figure 8:
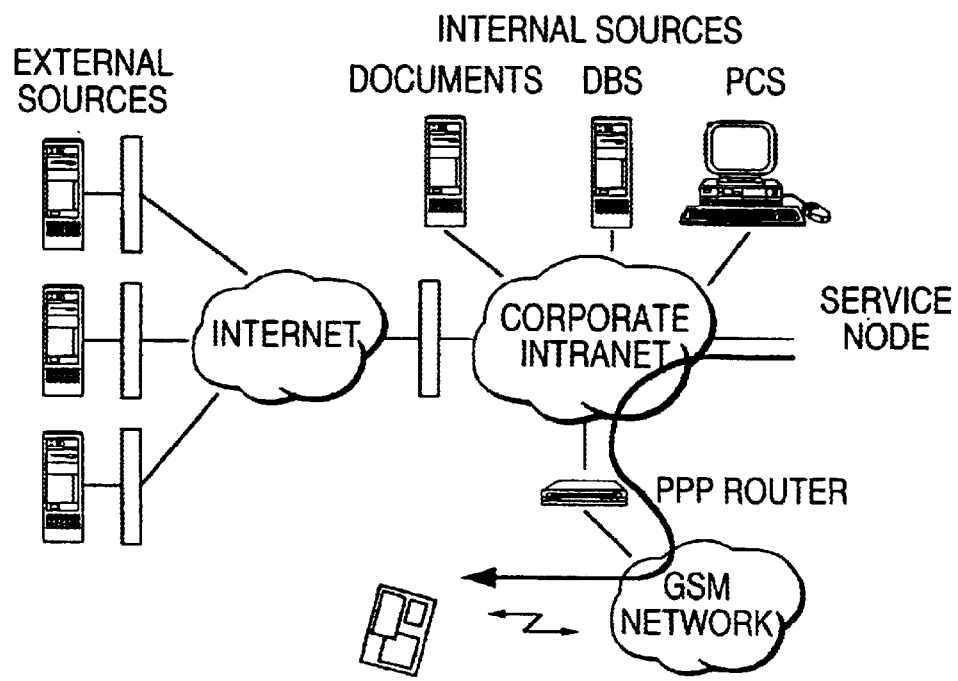
FIG. 8 illustrates the download of pushed data from a service node to a user.

As illustrated in FIG. 8, the classified and profiled data for a particular user is pushed from the service node through the corporate intranet and a PPP router and GSM network to a particular user.

Figure 9:
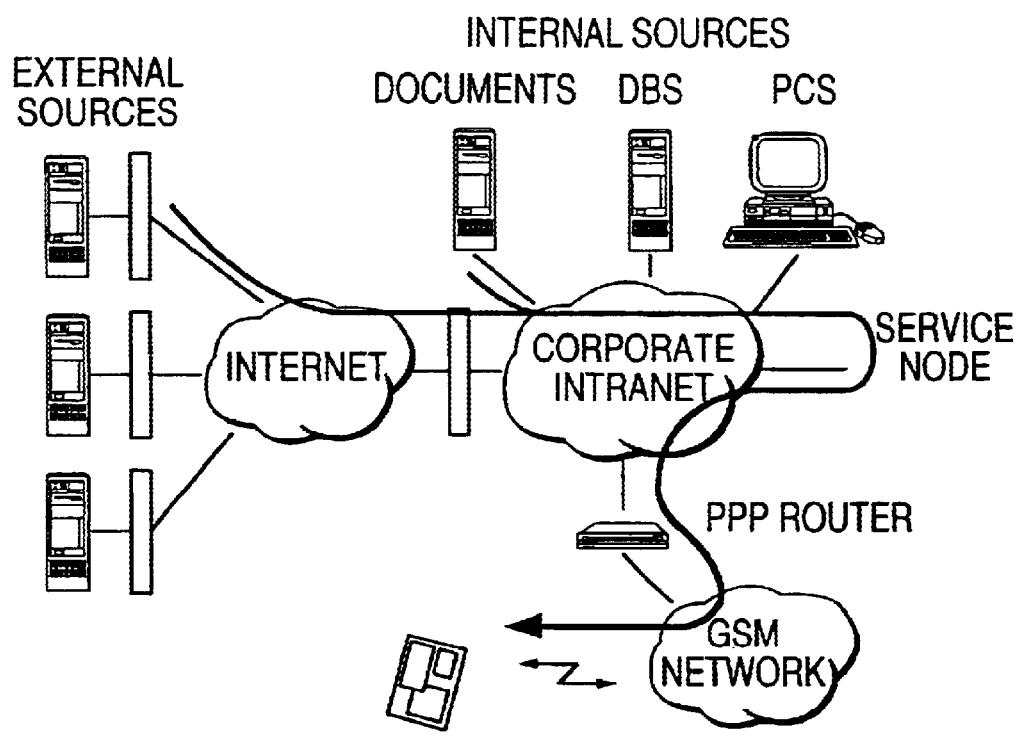
FIG. 9 illustrates data retrieval via links in a service node.

As illustrated in FIG. 9, data may be retrieved via links utilizing the service node. That is, data from an external source, upon request, is forwarded through its respective firewall and the Internet and the corporate firewall and the Intranet to the service node where it is routed back through the corporate Intranet and the PPP router and GSM network to a user requesting the data.

Figure 10:
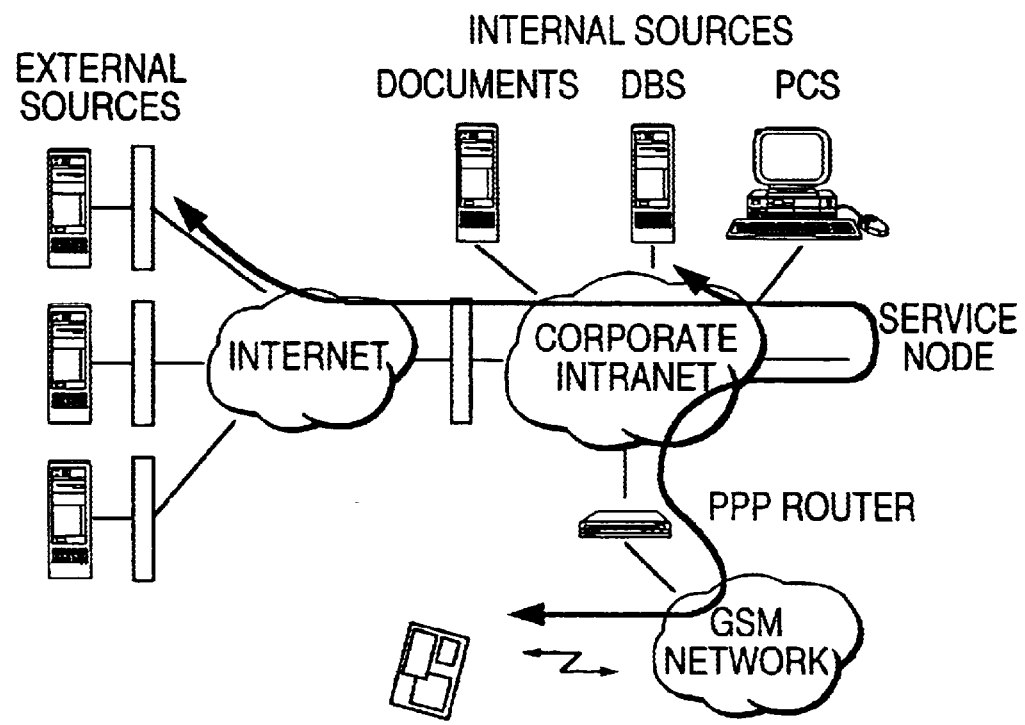
FIG. 10 illustrates the interactions of various elements with data sources.

As illustrated in FIG. 10, data contained within the service node may be forwarded through the corporate Intranet to the internal sources such as documents storage, databases, and individual PCs as well as being forwarded through the PPP router and GSM network to an individual user. Lastly, data may be forwarded through the corporate Intranet and corporate firewall and the Internet to a firewall of an external source to an external data source.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the disclosed embodiment for carrying out the present invention, but that the present invention includes all embodiments falling within the scope of the appended claims.

What is claimed is:

1. An information management method comprising:

gathering and storing data from a plurality of data sources;

filtering and prioritizing the gathered and stored data into a plurality of layers arranged sequentially, a first layer having a broadest categorization of data and each subsequent lower layer having a narrower categorization of data than an adjacent higher layer;

packaging the filtered and prioritized data; and delivering the packaged data to an end user as a function of priority of the gathered and stored data, wherein the first layer comprises a corporate layer, a second layer comprises a department layer, a third layer comprises a group layer and a fourth layer comprises a personal layer, and the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

2. The method of claim 1, wherein:

the plurality of data sources comprise external sources of data and internal sources of data.

3. The method of claim 2, wherein:

the external sources of data comprise sources of data accessible on the internet.

4. The method of claim 2, wherein:

the internal sources of data comprise sources of data accessible on a corporate Intranet.

5. The method of claim 2, wherein:

the internal sources of data comprise at least one of stored documents, stored databases and personal computers.

6. The method of claim 1, wherein:

when the function of priority is a highest priority, then the data is immediately delivered the end user and when the function of priority is a lower priority, then a signal is sent to the end user and the data is delivered upon a request by the end user.

7. The method of claim 1, wherein:

the gathered and stored data is filtered based on stored personalized information of the end user.

8. The method of claim 1, wherein:

the data is pushed to the end user if it has been prioritized as a highest priority.

9. An information management apparatus comprising:

means for gathering and storing data from a plurality of data sources;

means for filtering and prioritizing the gathered and stored data in a plurality of layers arranged sequentially, a first layer having a broadest categorization of data and each subsequent lower layer having a narrower categorization of data than an adjacent higher layer;

means for packaging the filtered and prioritized data; and means for delivering the packaged data to an end user or a function of priority of the gathered and stored data, wherein the first layer comprises a corporate layer, a second layer comprises a department layer, a third layer comprising a group layer and a fourth layer comprises a personal layer, and the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

10. The apparatus of claim 9, wherein:

the plurality of sources of data comprise external sources of data and internal sources of data.

11. The apparatus of claim 10, wherein:

the external sources of data comprise sources of data accessible on the Internet.

12. The apparatus of claim 10, wherein:

the internal sources of data comprise sources of data accessible on a corporate Intranet.

13. The apparatus of claim 10, wherein:

the internal sources of data comprise at least one of stored documents, stored databases and personal computers.

14. The apparatus of claim 9, wherein:

when the function of priority is a highest priority, then the data is immediately delivered to the end user and when the function of priority is a lower priority, then a signal is sent to the end user and the data is delivered upon a request by the end user.

15. The apparatus of claim 9, comprising:

means for filtering the gathered and stored data based on stored personalized information of the end user.

16. The apparatus of claim 9, comprising:

means for pushing the data to the end user if it has been prioritized as a highest priority.

17. A computer program of instructions, executable by a machine and embodied in a tangible medium, performing method steps comprising:

gathering and storing data from a plurality of data sources in a plurality of layers arranged sequentially, a first layer having a broadest categorization of data and each subsequent lower layer having a narrower categorization of data than an adjacent higher layer;

filtering and prioritizing the gathered and stored data;

packaging the filtered and prioritized data; and delivering the packaged data to an end user as a function of the gathered and stored data, wherein the first layer comprises a corporate layer, a second layer comprises a department layer, a third layer comprises a group layer and a fourth layer comprises a personal layer, and the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

18. The program of claim 17, wherein:

the plurality of data sources comprise external sources of data and internal sources of data.

19. The program of claim 18, wherein:

the external sources of data comprise sources of data accessible on the Internet.

20. The program of claim 18, wherein:

the internal sources of data comprise sources of data accessible on a corporate Intranet.

21. The program of claim 18, wherein:

the internal sources of data comprise at least one of stored documents, stored databases and personal computers.

22. The program of claim 17, wherein:

when the function of priority is a highest priority, then the data is immediately delivered to the end user and when the function of priority is a lower priority, then a signal is sent to the end user and the data is delivered upon a request by the end user.

23. The program of claim 18, wherein:

the gathered and stored data is filtered based on stored personalized information of the end user.

24. The program of claim 18, wherein:

the data is pushed to the end user as if the data has been prioritized as a highest priority.

* * * * *